United States Patent

Rovati et al.

[15] 3,697,652

[45] Oct. 10, 1972

[54] N-ACETYLGLUCOSAMINE FOR TREATING DEGENERATIVE AFFLICTIONS OF THE JOINTS

[72] Inventors: Luigi Rovati; Sergio Mascherpa; Pierluigi Casula, all of Valosa, Italy

[73] Assignee: Rotta Research Laboratorium S.p.A., Milan, Italy

[22] Filed: Aug. 19, 1969

[21] Appl. No.: 851,446

[30] Foreign Application Priority Data

Aug. 22, 1968 Germany..........P 17 92 346.5

[52] U.S. Cl. ................................................424/180
[51] Int. Cl. ............................................A61k 27/00
[58] Field of Search......................................424/180

[56] References Cited

OTHER PUBLICATIONS

Chem. Abstr. 60– 13745 c (1964).

*Primary Examiner*—Stanley J. Friedman
*Assistant Examiner*—Vincent D. Turner
*Attorney*—Berlin, Maky, Donnelly & Renner

[57] ABSTRACT

Pharmaceutical preparations for the treatment of degenerative afflications of the joints, with such preparations containing as the active ingredient one or more N-acyl compounds of aminocarbohydrates.

7 Claims, No Drawings

N-ACETYLGLUCOSAMINE FOR TREATING DEGENERATIVE AFFLICTIONS OF THE JOINTS

The present invention relates to pharmaceutical preparations for the treatment of degenerative afflications of the joints. The pharmaceutical preparations according to the invention are characterized in that they contain as the active ingredient one or more N-acyl compounds of aminocarbohydrates.

N-acyl compounds of aminocarbohydrates are only known in certain respects. They have not been used heretofore as a pharmaceutical preparation for treatment of human bodies, particularly in the case of degenerative afflications of the joints. It has now been discovered that the N-acyl compounds of aminocarbohydrates give in this connection, with a low degree of toxicity, outstanding results even after extended periods of use.

The pharmaceutical preparations according to the present invention preferably contain N-acyl compounds of hexosamines and, more particularly of glucosamines and/or galactosamines. The preferred N-acyl compounds are the N-acetyl compounds since they are readily available. They are also distinguished by superior compatibility.

Aside from the active ingredients according to the present invention, the pharmaceutical preparations may also contain, as usual, other active ingredients or one or more pharmaceutical diluents or carrier substances for pharmaceutical preparations. The additional active ingredients, considered suitable in accordance with the present invention, are particularly inorganic salts, preferably sulfates and/or iodides of alkaline earth and/or alkali metals. More particularly, the preferred inorganic salts are sodium sulfate, sodium iodide, and mixtures thereof. This combination gives excellent pharmacological results. The joint use of the aforesaid compounds according to the present invention, with inorganic salts is therefore preferred. It is recommended to use per mole of acyl compound about 0.2-4 equivalent based upon the anionic constituent of inorganic salts.

It is possible to add, in the case of preparations that need not be sterilized, small quantities of salts of aminocarbohydrates or of the free bases. Particularly effective salts are the sulfates and/or iodine hydrates of aminocarbohydrates, especially of glucosamine and/or glactosamine.

The pharmaceutical preparations according to the invention can be administered orally, rectally or parenterally. It is preferred to administer them in the form of injectable aqueous solutions, since it was found that the N-acyl compounds of aminocarbohydrates in aqueous solution remain stable even after sterilization, which is not the case with salts of these compounds.

Depending upon the manner of administration and the particular person to be treated, each dose will lie as a rule within the range from 100 milligrams to 1 gram. The administration can be effected in the form of tablets, capsules, suppositories, coated pills, solutions or the like. For these purposes, it is preferred to administer the preparations in the form of so-called unit doses. Each dose, in this case, contains the aforesaid quantity of about 100 milligrams to 1 gram of one or more of the N-acyl compounds of aminocarbohydrates. Preferably, each unit dose should contain about 200 to 750 milligrams and, more especially, about 200 to 500 milligrams.

The expression "unit dose" means, in the context of the present invention, a physically determined unit that contains a single quantity of the active constituent admixed with a pharmaceutical binder therefor or associated with a common pharmaceutical carrier. In this case, the quantity of active constituent is such that one or more units are normally required for a single therapeutic administration or that, in the case of divisible units such as notched tablets, at least one part of such a divisible unit, for example one half or one quarter, is required for a single therapeutic administration.

A carrier, which can serve as vehicle, excipient or diluent for the active therapeutic constituent, may be a solid, semi-solid or liquid substance. A few examples of carriers that can be used for the pharmaceutical preparations in accordance with the present invention, are lactose, dextrose, sucrose, sorbite, mannite, starch, gum acacia, coconut butter, cocoa butter, calcium phosphate, alginates, gum tragacanth, gelatin, methyl cellulose, water, etc. When the pharmaceutical preparations are administered in the form of coated pills it is possible to use as coating materials for example ethyl cellulose acetate phthalate, acetyl cellulose acetate of low viscosity, various waxes such as paraffin wax, mineral wax, for example montan wax, vegetable wax such as carnauba wax, or insect wax such as shellac wax. The coating material can also be a resin of plant origin or even sugar. These coating materials may also contain a certain quantity of plasticizer such as dioctylphthalate or diethylphthalate.

When the pharmaceutical preparations according to the invention are administered as injectable solutions, they should also contain a pain-killing agent such as diethylamino-dimethylacetanilide hydrochloride.

The pharmaceutical preparations according to the invention have the property of promoting the synthesis of mucopolysaccharides as fundamental constituents of the cartilage, of improving the binding of the sulfur in the cartilage tissue and the absorption of the calcium in the bone tissue. In addition to this, they promote the viscosity and separation of the synovial fluid, which is also effective as a joint lubricant. They act in every way upon the pathophysiology and pathomorphology of the primary and, as much as possible, also the secondary arthrosis. Inflammation occurrences are arrested.

The preparations according to the present invention are thus capable of exerting a favorable influence upon all regressive and degenerative processes of hard tissues. It is a self-evident truth that enduring results can only be achieved by enduring therapy.

A sufficiently extended treatment period with adequate doses is therefore a basic prerequisite for lasting results. The beneficial effect can be expected to take place sooner, the higher the concentration of the active ingredient at the point of lesion.

As distinguished from the exclusive use of salts of aminocarbohydrates, the use of the N-acetyl compounds in accordance with this invention presents a number of advantages. Salts are generally highly hygroscopic which makes the shaping thereof in the form of tablets and/or coated pills much more difficult. Another drawback of the salts is the fact that they have a relatively high acid reaction. If the pH value is adjusted by the addition of alkali, this produces an accelerated decomposition of the salts which is objectionable particularly during sterilization. It is practically impossible to sterilize aminocarbohydrates by heating since heating causes them to decompose. Even at normal temperatures the decomposition of the salts is perceptible. In comparison, the N-acetyl compounds according to the present invention are exceedingly stable. They can be sterilized without difficulty by heating in an autoclave. The essential advantage of the N-acetyl compounds according to the present invention over the corresponding salts, is the fact that they can be stabilized in a safer and better manner, without the necessity for a correction of the pH-value which was found to have a detrimental effect.

EXAMPLE 1

Preparation of suppositories:

| | |
|---|---|
| N-acetylglucosamine | 200 g |
| cocoa butter | 800 g |

The N-acetylglucosamine is stirred into the melted cocoa butter which is heated at 45° C so as to prepare a smooth suspension. The thoroughly stirred mixture is then poured into the molds, each having the nominal size of 1 gram, with a view to preparing suppositories.

EXAMPLE 2

Intramuscular injections (solution in an aqueous medium):

| | |
|---|---|
| N-acetylglucosamine | 250 g |
| diethylamino-dimethylacetanilide-hydrochloride | 5 g |
| water, bidistilled for injection purposes | up to 5 ml |

The active ingredients are dissolved in water and the solution is filled into ampoules. The latter can be sterilized by heating in an autoclave. The solution can be injected both intravenously or intraarticular.

EXAMPLE 3

Preparation of coated pills:

| | |
|---|---|
| N-acetylglucosamine | 250 g |
| additives for core | |
| stearin | 2.5 mg |
| talcum DAB 6 | 2.5 mg |
| additives for coating | |
| white sugar | 95 mg |
| talcum DAB 6 | 60 mg |
| calcium carbonate DAB 6 | 30 mg |
| gum arabic | 8 mg |
| shellac | 2 mg | final weight of pill 450 mg.

EXAMPLE 4

Preparation of sirup:

| | |
|---|---|
| N-acetylglucosamine | 166 g | is dissolved in 3.5 liters of distilled water and brought to boiling. Upon cooling the following are added:

| | |
|---|---|
| sorbitol 70% conc. | 5060 ml |
| ethyl alcohol 95% conc. | 500 ml |
| flavoring substances | 50 ml |

The solution is made up with distilled water to total 10 liters.

EXAMPLE 5

Aqueous solution for intravenous, intramuscular and intraarticular injections:

The following constituents were dissolved, in the cold, in 8 liters of bidistilled water:

| | |
|---|---|
| N-acetylglucosamine | 800 g |
| sodium iodide | 190 g |
| sodium sulfate | 120 g |
| After obtaining this solution there was added | |
| diethylamino-dimethylacetanilide-hydrochloride | 10 g |

It is adjusted, if necessary, to a pH of 8.2-8.3 and then made up with bidistilled water to a volume of 10 liters. The solution filled into ampoules of 5 ml. The sterilization is carried out at 100°C for 45 minutes.

EXAMPLE 6

Aqueous solution for intravenous, intramuscular and intraarticular injections:

| | |
|---|---|
| N-acetylglucosamine | 220 mg |
| sodium iodide | 70 mg |
| sodium sulfate | 40 mg |
| diethylamino-dimethylacetanilide-hydrochloride | 5 mg |
| make up with bidistilled water | 5 mg |

The active ingredients are dissolved in water and the solution is filled into ampoules. The latter can be sterilized by heating in an autoclave.

EXAMPLE 7

Preparation of coated pills:

| | |
|---|---|
| N-acetylglucosamine | 250 mg |
| sodium iodide | 70 mg |
| sodium sulfate | 40 mg |
| Additives for core: | |
| stearin | 2.5 mg |
| talcum DAB 6 | 2.5 mg |
| Additives for coating: | |
| white sugar | 95 mg |
| talcum DAB 6 | 60 mg |
| calcium carbonate DAB 6 | 30 mg |
| gum arabic | 8 mg |
| shellac | 2 mg | final weight of pill 550 mg.

EXAMPLE 8

Preparation of coated pill:

| | |
|---|---|
| N-acetylglucosamine | 250 mg |
| glucosamine hydrochloride | 50 mg |
| sodium iodide | 66 mg |
| sodium sulfate | 42 mg |
| Additives for core: | |
| stearin | 2.5 mg |
| talcum DAB 6 | 2.5 mg |
| Additives for coating: | |
| white sugar | 95 mg |
| talcum | 60 mg |
| calcium carbonate DAB 6 | 30 mg |
| gum arabic | 8 mg |
| shellac | 2 mg | final weight of pill 600 mg.

EXAMPLE 9

Capsule preparation:

| | |
|---|---|
| N-acetylglucosamine | 220 mg |
| sodium iodide | 80 mg |
| sodium sulfate | 30 mg |
| fillers | |

The constituents are thoroughly mixed and filled into gelatin capsules.

EXAMPLE 10

Capsule preparation:

| | |
|---|---|
| N-Acetylglucosamine | 230 mg |
| Potassium Sulfate | 50 mg |
| Potassium Iodide | 80 mg |
| fillers | |

The constituents are thoroughly mixed and filled into gelatine capsules.

EXAMPLE 11

Aqueous solution for intramuscular, intravenous and intraarticular injections:

The following compounds are dissolved in 8 liters of bidistilled water:

| | |
|---|---|
| N-acetylglucosamine | 610 g |
| N-acetylgalactosamine | 130 g |
| Sodium iodide | 190 g |
| Sodium sulfate | 120 g | and further processed as described in Example 6.

The procedures and examples given above are representative of typical embodiments of the invention and are not intended to limit the scope thereof.

We claim:

1. A pharmaceutical preparation comprising a pharmaceutically acceptable carrier, an amount effective for the treatment of degenerative afflictions of the joints of an active ingredient consisting of N-acetylglucosamine, and from about 0.2 to 4 equivalents per mole of active ingredient of an inorganic salt selected from the group consisting of sodium sulfate, sodium iodide, and mixtures thereof, said equivalents being based on the anionic constituent of the salt.

2. A pharmaceutical preparation as defined by claim 1, which is present in the form of an aqueous sterilized injectable solution.

3. A pharmaceutical preparation as defined by claim 1, further comprising glucosamine hydrochloride.

4. A pharmaceutical preparation as defined by claim 1, which is present in the form of a capsule to be administered orally.

5. A method for treating degenerative afflictions of the joints which comprises administering internally to the body a pharmaceutical preparation comprising a pharmaceutically acceptable carrier and from 100 mg to 1 gram of an active ingredient consisting of N-acetylglucosamine.

6. A method for treating degenerative afflictions of the joints as defined by claim 5, wherein said pharmaceutical preparation contains from about 200 to 500 mg. of said active ingredient.

7. A method for treating degenerative afflictions of the joints as defined by claim 5, wherein said pharmaceutical preparation further comprises from about 0.2 to 4 equivalents per mole of active ingredient of an inorganic salt selected from the group consisting of sodium sulfate, sodium, iodide, and mixtures thereof, said equivalents being based on the anionic constituent of the salt.

* * * * *